US006833641B2

(12) United States Patent
Uchida et al.

(10) Patent No.: US 6,833,641 B2
(45) Date of Patent: Dec. 21, 2004

(54) ELECTRIC DRIVE UNIT

(75) Inventors: Tatsuki Uchida, Anjo (JP); Hirotaka Yata, Anjo (JP); Yukio Yamada, Anjo (JP)

(73) Assignee: Aisin AW. Co., Ltd., Anjo (JP)

( * ) Notice: Subject to any disclaimer, the term of this patent is extended or adjusted under 35 U.S.C. 154(b) by 0 days.

(21) Appl. No.: 10/705,431

(22) Filed: Nov. 12, 2003

(65) Prior Publication Data

US 2004/0124722 A1 Jul. 1, 2004

(30) Foreign Application Priority Data

Dec. 27, 2002 (JP) ........................................ 2002-380497

(51) Int. Cl.$^7$ ................................................. H02K 9/19
(52) U.S. Cl. ........................................... 310/54; 310/52
(58) Field of Search ............................ 310/52, 54, 58, 310/64, 75 R, 67 R; 180/65.1, 65.5, 65.8, 65.6; 74/606 A; 123/41.31

(56) References Cited

U.S. PATENT DOCUMENTS

| | | | | |
|---|---|---|---|---|
| 3,800,913 A | * | 4/1974 | Schmitt ..................... 184/6.13 |
| 4,284,913 A | * | 8/1981 | Barnhardt ..................... 310/54 |
| 4,373,356 A | * | 2/1983 | Connor ........................ 62/468 |
| 5,111,089 A | * | 5/1992 | Wakuta et al. ................ 310/54 |
| 5,161,644 A | * | 11/1992 | Swenskowski et al. .... 184/6.12 |
| 5,359,247 A | * | 10/1994 | Baldwin et al. .............. 310/54 |
| 5,509,381 A | * | 4/1996 | Fisher ...................... 123/41.31 |
| 5,585,681 A | * | 12/1996 | Bitsche ........................ 310/54 |
| 5,632,157 A | * | 5/1997 | Sekino et al. ................. 62/244 |
| 5,768,954 A | * | 6/1998 | Grabherr et al. .......... 74/606 R |
| 5,821,653 A | * | 10/1998 | Kinto et al. ................... 310/89 |
| 6,323,613 B1 | | 11/2001 | Hara et al. ................... 318/471 |

* cited by examiner

Primary Examiner—Burton Mullins
(74) Attorney, Agent, or Firm—Oliff & Berridge, PLC

(57) ABSTRACT

A working oil accumulated in oil reservoirs is supplied to electric motor cooling oil passages and lubricating oil passages in well-balanced manner all during the time of normal and very low temperatures in an electric drive unit. The electric drive unit comprises an electric motor and a feed oil passage, through which a working oil for cooling and lubrication is supplied to respective mechanisms of a drive unit including the electric motor, in a drive unit body. An oil reservoir communicates with a working oil supply source and is provided in an upper area of the drive unit body. A weir is provided between a first reservoir, which communicates the oil reservoir to the working oil supply source and communicated to small flow-rate discharge oil passages, and a second reservoir communicates with a large flow-rate discharge oil passage. Because discharge of the working oil to the large flow-rate discharge oil passage is thereby restricted until the working oil reaches a level to go over the weir, setting of an orifice on a side of the large flow-rate discharge oil passage in conformity to flowability of the working oil at the time of very low temperature makes it possible to prevent the working oil from excessively flowing to the side of the large flow-rate discharge oil passage at the time of normal temperature, while preventing a pressure rise in the oil reservoirs at the time of very low temperature.

15 Claims, 6 Drawing Sheets

ELECTRIC DRIVE UNIT

This application claims priority from JP2002-380497 filed Dec. 27, 2002, the contents of which are incorporated herein by reference thereto.

BACKGROUND OF THE INVENTION

1. Field of Invention

The invention relates to a drive unit making use of an electric motor as a power source, and more particularly, to cooling and lubricating techniques in drive units for electric motorcars and hybrid drive units.

2. Description of Related Art

Because electric drive units, with an electric motor as a drive source, of a vehicle make use of as small electric motors as possible in conformity with a drive load at the time of normal running. When the motors are operated in a high loaded state, i.e., when a drive load is large, cooling is required to counter the generation of heat specifically at the time of high load. Applicant of this application has proposed a technique of cooling an electric motor by means of a working oil (ATF: automatic transmission fluid), which is circulated in a drive unit casing to lubricate and cool respective mechanisms of the electric drive unit, in a preceding application (JP-A-2001-238406).

The technique thus proposed provides an oil reservoir on a feed oil passage of a working oil so as to preferentially cool the working oil, which has absorbed heat, in one location. A cooling water passage is in contact with the oil reservoir. The resultant configuration, in which the working oil for cooling an electric motor is supplied, dripping from an oil reservoir provided in an upper area of the drive unit casing, and the hydraulic pressure in the oil reservoir is held down to balance the pressure on a side of the cooling water passage.

Incidentally, the technique thus proposed makes use of oil reservoirs as means for distribution of an oil flow to an electric motor for cooling, and of an oil flow to respective mechanisms for both lubrication and cooling, and so adopts a configuration, in which amounts of the oil discharged from the oil reservoirs are orifice-controlled in respective discharge oil passages. Although such orifice-control functions effectively at the time of normal temperatures at which a working oil has favorable flowability, oil flows in discharge oil passages on a side (for example, a side, on which respective mechanisms are lubricated) on which the orifices are large in diameter, are extremely increased relative to discharge oil passages on a side (for example, a side, on which an electric motor is cooled) on which the orifices are small in diameter, in a state in which flowability is sharply worsened due to an increase in viscosity at the time of very low temperature below −20 to −30° C., so that an amount of an oil supplied to a region, to which an oil is supplied from the discharge oil passages on the side, on which orifices are small in diameter, is insufficient.

SUMMARY OF THE INVENTION

Hereupon, it is an object of the invention to provide an electric drive unit, which relies on orifice control and can discharge a working oil from oil reservoirs in a well-balanced manner all during the time of normal temperature and very low temperatures to perform cooling of an electric motor and lubrication and cooling of respective mechanisms.

In order to attain the above object, the invention provides an electric drive unit comprising an electric motor, a feed oil passage, which is provided in a casing of the drive unit and through which a working oil for cooling and lubrication is supplied to respective mechanisms of the drive unit including the electric motor, and an oil reservoir provided in an upper area of the casing of the drive unit to be communicated to a supply source of the working oil, and wherein the oil reservoir comprises a weir between a first reservoir, which is in communication with the supply source of the working oil and a first discharge oil passage, and a second reservoir in communication with a second discharge oil passage.

With the above structure, a configuration is effective in which the first discharge oil passage is opened above a coil of the electric motor through a first orifice, and the second discharge oil passage is in communication with an in-shaft oil passage of the electric motor leading to the respective mechanisms. Further, a configuration is effective in which the second discharge oil passage comprises a second orifice having a larger opening area than that of the first orifice. In this case, a configuration is effective in which the weir comprises an opening providing communication between the first reservoir and the second reservoir to guarantee supply of the working oil to the in-shaft oil passage of the electric motor. In this case, it is desired that the opening be composed of a first opening, having a larger opening area than that of the first orifice, and a second opening, having a larger opening area than that of the first opening, the second opening being arranged above the first opening at the time of being mounted on a vehicle. Further, it is desired that an opening of the first discharge oil passage in the first reservoir be arranged below a second opening of the weir at the time of being mounted on a vehicle. Furthermore, it is desired that the opening of the first discharge oil passage in the first reservoir be arranged above the first opening of the weir. Also, the opening area of the second orifice is set on the basis of the viscosity of the working oil in a cold state and pressure resistance of the oil reservoir. Also, a configuration is effective in which the oil reservoir contacts with a cooling medium flow passage with a heat transfer wall therebetween.

With the structure of a first aspect according to the invention, discharge of the working oil to the second discharge oil passage from the second reservoir is restricted until the working oil supplied from the supply source of the working oil to be accumulated in the first reservoir reaches a level to go over the weir in the oil reservoir, so that it is possible to rapidly accumulate a working oil in the oil reservoir even in a state, in which a working oil is bad in flowability at the time of very low temperature, while ensuring discharge of a working oil into the first discharge oil passage. Accordingly, with such arrangement, an oil level in the oil reservoir can be elevated to a level in a normal state even at the start, in very low temperatures, with the result that a working oil can be smoothly supplied to the first and second discharge oil passages.

Subsequently, with the structure of a second aspect according to the invention, the first orifices restrict discharge of a working oil from the first discharge oil passages whereby it is possible to expedite the rise of an oil level in the first reservoir even at the start, in very low temperatures, while ensuring the supply of a working oil to that side of the motor, which requires a small amount of supply and is to be cooled, thereby enabling expedited lubrication of the respective mechanisms, which requires a large amount of supply, and supply of a working oil to a side being cooled.

Subsequently, with the structure of a third aspect according to the invention, even when an oil level in the oil reservoir rises to place the oil reservoir in a filled state, the second orifice is used to adequately ensure discharge of a working oil from the second discharge oil passage in the same manner as at the time of a normal temperature, so that it is possible to suppress a pressure rise in the oil reservoir.

Also, with the structure of a fourth aspect according to the invention, because a working oil is discharged to the second discharge oil passage through the opening of the weir also in a state in which an oil level in the oil reservoir is not over the weir, supply of a working oil to lubricating portions of the respective mechanisms and the side being cooled is ensured.

Also, with the structure of a fifth aspect according to the invention, oil can also be supplied to the second discharge oil passage from the first opening before the accumulation of oil in the first reservoir has finished.

Also, with the structure of a sixth aspect according to the invention, oil can be surely supplied to the first discharge oil passage before a large amount of oil is supplied to the second reservoir from the second opening.

Also, with the structure of a seventh aspect according to the invention, even when an oil level in the oil reservoir is so low as not to be able to supply oil for cooling to the first discharge oil passage, oil can be supplied from the first opening, so that a minimum supply of a working oil is ensured to be supplied to the lubricating portions of the respective mechanisms.

Also, with the structure of a eighth aspect according to the invention, even when an oil level in the oil reservoir rises to place the oil reservoir in a filled state, the second orifice is used to adequately ensure discharge of a working oil from the second discharge oil passage even in a state of bad flowability at the time of a very low temperature, so that it is possible to suppress a pressure rise in the oil reservoir. Also, restriction on the flow with the weir makes it possible to prevent that insufficiency in discharge of a working oil toward the first discharge oil passage, which is caused by making the second orifice large.

Also, with the structure of a ninth aspect according to the invention, heat exchange with a cooling medium through the heat transfer wall in the oil reservoir, in which a working oil circulating in the drive unit casing accumulates, enables preferentially cooling a working oil whereby it is possible to efficiently cool the motor and the respective mechanisms. At that time, because pressure rise in the oil reservoir is suppressed, even at the time of very low temperature, seal leakage between the oil reservoir and the cooling medium flow passage, which contact with each other, is prevented whereby it is possible to prevent a cooling medium from being entrained into the working oil.

BRIEF DESCRIPTION OF THE DRAWINGS

The invention will be described below with reference to the drawings.

DETAILED DESCRIPTION OF PREFERRED EMBODIMENTS

Figure 3:
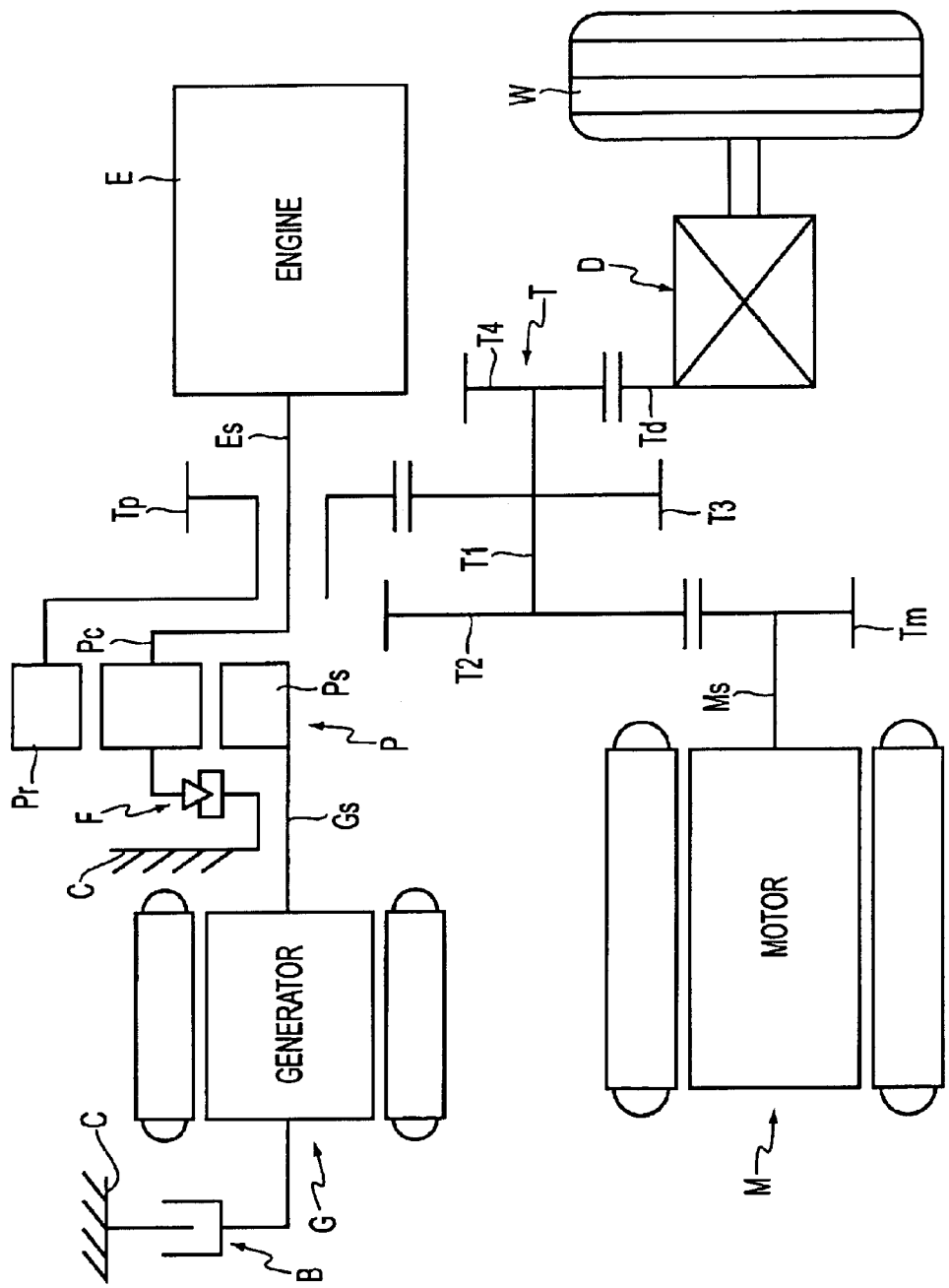
FIG. 3 is a skeleton view showing a gear train of the hybrid drive apparatus according to the embodiment.

FIG. 3 schematically shows a gear train of a hybrid drive unit according to the invention. The apparatus is connected to an internal combustion engine (referred below to as engine) E to comprise a drive unit. Its main elements are an electric motor (referred below to as motor) M, a generator G also used as an electric motor, and a differential unit D, among which a planetary gear set P having a single pinion configuration and a counter gear mechanism T are interposed, a one-way clutch F and a brake B being attached thereto.

The drive unit has a four-shaft configuration, in which the generator G is arranged on a first shaft that is coaxial with the engine E, the motor M is arranged on a second shaft parallel thereto, the counter gear mechanism T is arranged on a third shaft in similar fashion, and the differential unit D is arranged on a fourth shaft. The engine E and the generator G are coupled to the differential unit D through the planetary gear set P and the counter gear mechanism T, and the motor M is coupled to the differential unit D through the counter gear mechanism T.

The motor M is coupled to the counter gear mechanism T with a counter drive gear Tm fixed on its rotor shaft Ms meshing with a counter driven gear T2, the engine E is coupled to the generator G and the counter gear mechanism T with its output shaft Es coupled to a carrier Pc of the planetary gear set P, and the generator G is coupled to the engine E and the counter gear mechanism T with its rotor shaft Gs coupled to a sun gear Ps of the planetary gear set P. A ring gear Pr of the planetary gear set P is coupled to a counter drive gear Tp on the first shaft, which meshes with a counter driven gear T3 of the counter gear mechanism T. The counter gear mechanism T comprises the counter driven gear T2 fixed to a counter shaft T1, the counter driven gear T3, and a differential drive pinion gear T4, which meshes with a differential ring gear Td fixed to a differential casing of the differential unit D. The differential unit D is connected to a wheel W.

The one-way clutch F is arranged with its inner race connected to the carrier Pc and its outer race connected to a drive unit casing C in order to prevent reverse rotation of the carrier Pc by a reaction force from the drive unit casing C. The brake B is provided to stop the rotor shaft Gs of the generator G by locking to the drive unit casing C when needed. Thereby, it prevents generation of drive loss when the rotor shaft Gs rotates by a reaction torque when generation of electrical energy is unnecessary. A brake hub is connected to the rotor shaft Gs. A frictional engagement member engages with the brake hub and the drive unit casing C.

With the drive unit structured as above, the motor M and the wheel W are placed in a directly connected relationship for power transmission in spite of a slowing-down relationship corresponding to a gear ratio created by the counter gear mechanism T while the engine E and the generator G are put in an indirectly connected relationship for power transmission with each other and with the counter gear mechanism T through the planetary gear set P. By adjusting a power-generating load of the generator G against the ring gear Pr, which receives a running load of the vehicle through the differential unit D and the counter gear mechanism T, it is possible to adjust the distribution ratio of the engine output between a drive force and power-generating energy (charging battery) during vehicle movement. Also, because a reaction force on the carrier Pc is reversed by driving the generator G as a motor, the carrier Pc is caused to function as a reaction-force element latched on the drive unit casing C, through the one-way clutch F, whereby output of the generator G can be transmitted to the ring gear Pr and so drive forces at the departure of a vehicle can be increased (running in parallel mode) by a simultaneous output of the motor M and the generator G.

Figure 1:
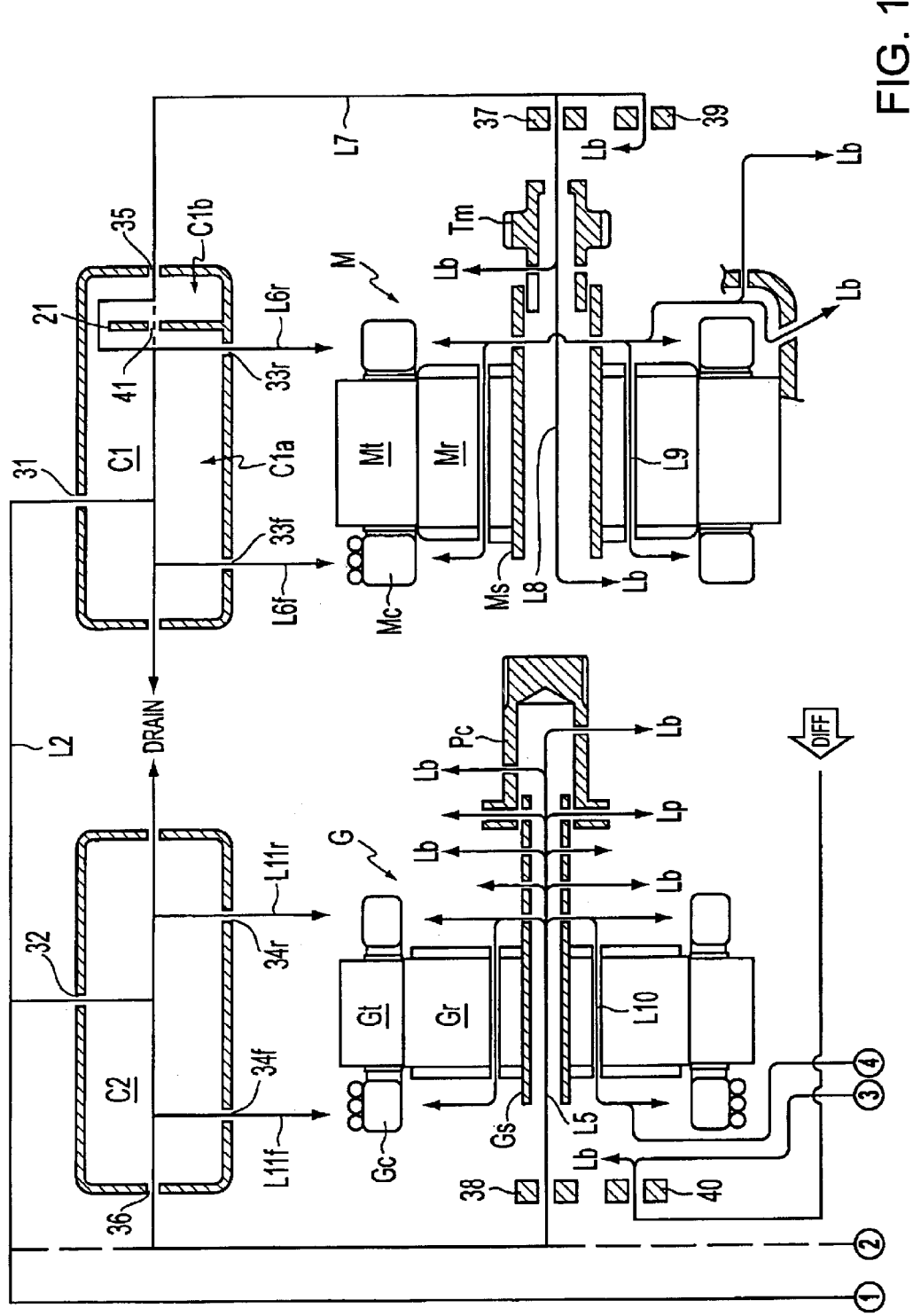
FIG. 1 is a circuit diagram showing one of two sections, in which: a hydraulic circuit of an embodiment in which the invention is applied to a hybrid drive apparatus.
Figure 2:
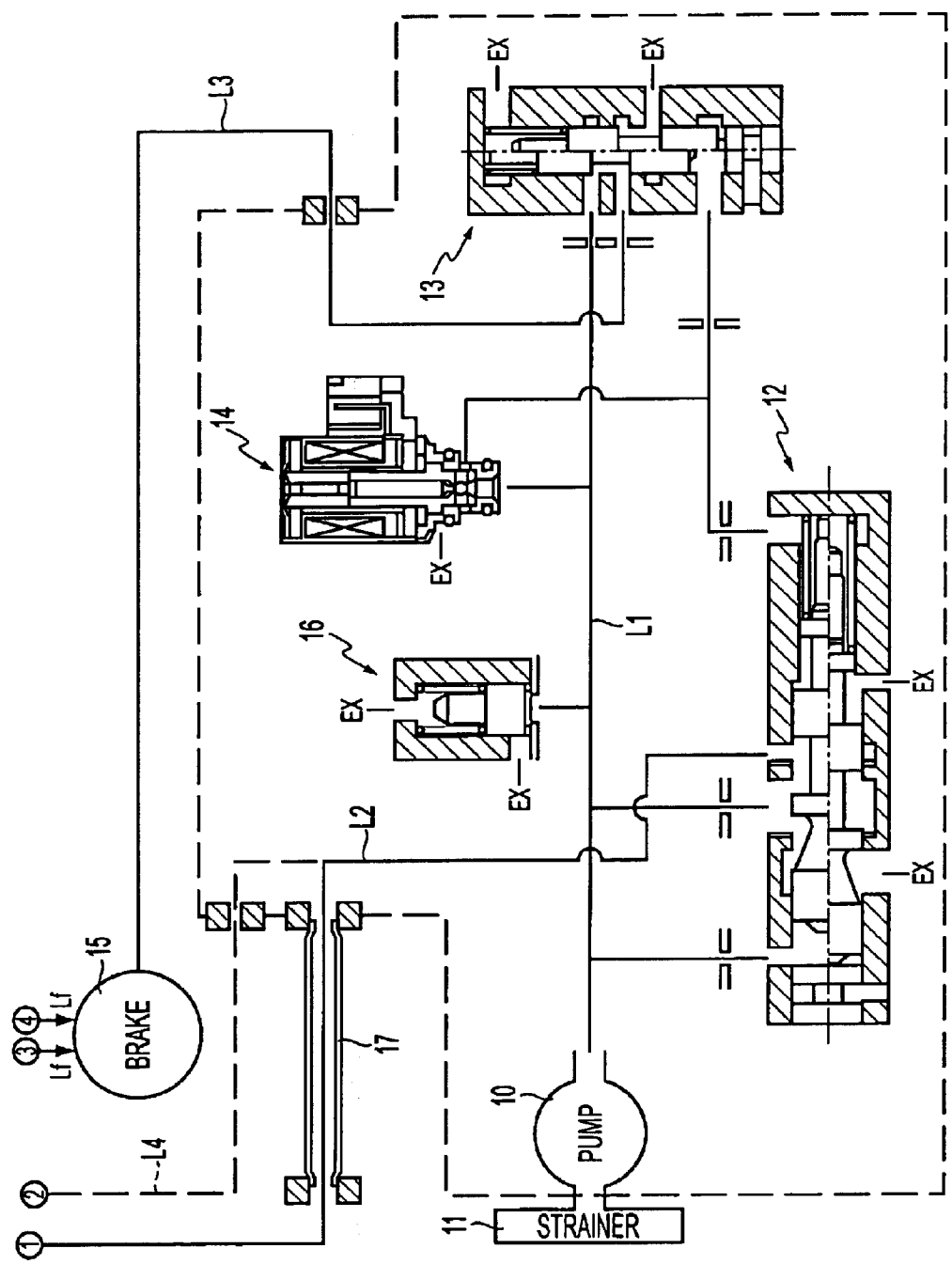
FIG. 2 is a second section of the circuit diagram started in FIG. 1.

Subsequently, FIGS. 1 and 2 show a hydraulic circuit of the hybrid drive unit divided into two sections. A working oil in the circuit serves as a working oil for actuation of a hydraulic servo 15 of the brake B of the drive unit, a lubricating oil for the lubrication and cooling of respective mechanisms, and a cooling medium for cooling of the motor M and the generator G, and is the ATF described previously. The working oil will be referred to below as oil in the following description of the embodiment. The circuit comprises, as the main elements, an electrically-driven oil pump 10 for drawing the oil through a strainer 11 from an oil sump. The oil sump is constituted by a bottom of the drive unit casing C. The oil is discharged to a line pressure oil passage L1 of the circuit, a regulator valve 12 for generating a line pressure in the oil passage L1, a brake valve 13 for controlling of the engagement and disengagement of the brake B, and a solenoid valve 14 for switching control of the brake valve 13. The valves 12, 13, 14, with oil passage L1 constitute a control circuit for feeding the oil, as a cooling medium for cooling of the motor M and the generator G and a lubricating oil, to a feed oil passage L2 of a circulation path and for controlling the communication of a feed oil passage L3 of the hydraulic servo 15 of the brake B to the line pressure oil passage L1 and communication to a drain. In addition, reference numeral 16 denotes a relief valve for prevention of an excessive rise in oil pressure in the line pressure oil passage L1.

The line pressure oil passage L1 on a discharge side of the oil pump 10 branches, one of the branches being connected to the feed oil passage L2 of the circulation path via the regulator valve 12 and the other of the branches being connected to the feed oil passage L3 of the hydraulic servo 15 of the brake B. The feed oil passage L2 is connected to an oil reservoir C2 for the generator G and an oil reservoir C1 for the motor M, which are provided in an upper portion of the drive unit casing C, via an oil passage 17 outside the drive unit casing. An in-casing oil passage L4 (indicated by dotted lines) branches from the feed oil passage L2 of the circulation path is connected to an oil passage L5 in the rotor shaft Gs of the generator G via an orifice 38 to constitute a forced lubrication oil passage for the generator G, and further branches to connect to the oil reservoir C2 for the generator G, which is provided in the upper portion of the drive unit casing C, via an orifice 36 to further unite with the feed oil passage L2. In addition to the oil passages L2, L4, L5, another oil passage leading from the differential unit D is provided and this oil passage constitutes an oil passage leading to bearings and friction members via an orifice 40.

In this description, the embodiment is applied to the oil reservoir C1 on the side of the motor M in the hydraulic circuit as an example. The oil reservoir C1 comprises a weir 21 between a first reservoir C1a communicating with oil passages L6f, L6r, which communicate with the oil pump 10, serving as a oil supply source, via the feed oil passage L2 and constitute first discharge oil passages, and a second reservoir C1b communicating with an oil passage L7 constituting a second discharge oil passage. The first discharge oil passages L6f, L6r are opened above a coil Mc of the motor M via first orifices 33f, 33r, and the second discharge oil passage L7 communicates with an in-shaft oil passage L8 of the motor M, which communicates with respective mechanisms. Further, the second discharge oil passage L7 comprises a second orifice 37 having a larger opening area than those of the first orifices 33f, 33r. Also, the weir 21 includes an opening 41 to communicate between the first reservoir C1a and the second reservoir C1b to assure an oil supply to the in-shaft oil passage L8 of the motor M. The opening area of the second orifice 37 is set on the basis of the viscosity of the fluid when the fluid is cold, and pressure resistance of the oil reservoir C1. Specifically, the opening area is set to generate such a resistance that keeps the internal pressure of the oil reservoir C1 less than a predetermined tolerance, even when oil, at the time of very low temperature, is continuously supplied in a large amount from the feed oil passage L2.

The oil reservoir C2 on the side of the generator G is structured such that an opening 32 on a supply side thereof communicates with the oil pump 10, serving as a oil supply source, via the feed oil passage L2. The oil reservoir C2 also communicates with the forced lubrication oil passage L4 via the orifice 36, and a discharge side thereof communicates with discharge oil passages L11f, L11r, that open above the coil Gc of the generator G, via openings 34f, 34r. In addition, in FIGS. 1 and 2, reference symbols, Lb among characters shown at ends of the respective oil passages, indicate allocation to lubrication of respective bearings, Lp indicates allocation to the planetary gear, and Lf indicate allocation to lubrication of the frictional engagement member of the brake.

Figure 4:
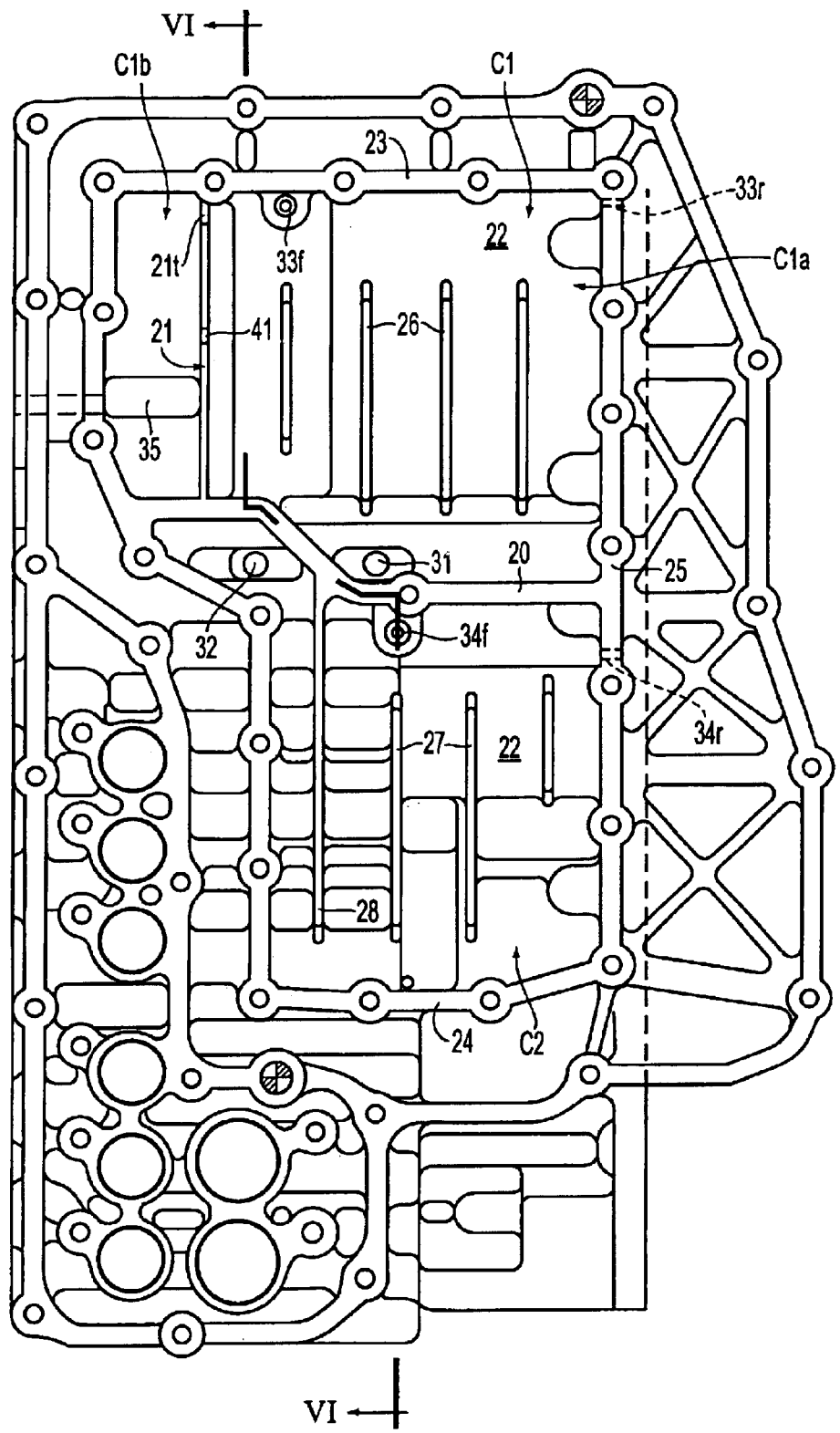
FIG. 4 is a plan view showing oil reservoirs in the hydraulic circuit according to the embodiment.

FIG. 4 shows an actual configuration of the oil reservoirs in plan view. As shown in the figure, the oil reservoirs are allotted to the motor M and the generator G. The openings 31, 32, respectively, for the feed oil passage L2 are provided in a bottom wall 22 to be adjacent to a transverse casing wall (for the convenience of explanation, a wall extending laterally in the figure and rising from a plane of the figure is referred to as a transverse wall) 20 separating the openings from each other. The first orifices 33f, 33r of the first discharge oil passages L6f, L6r in the first reservoir C1a of the oil reservoir C1 for the motor are disposed so as to have their inlet openings at the bottom wall 22 and a longitudinal wall 25 (likewise, a wall extending longitudinally in the figure and rising from a plane of the figure is referred to as the longitudinal wall 25) respectively. The bottom wall 22 and the longitudinal wall 25 are adjacent to a transverse wall 23. The transverse wall 23 is opposed to the transverse wall 20. The opening 31 of the feed oil passage L2 is disposed adjacent to the transverse wall 20. The weir 21 is arranged to extend between the transverse walls 20, 23 whereby an opening 35, opened substantially centrally of a bottom wall of the second reservoir C1b and separated from the first reservoir C1a, constitutes an inlet of the second discharge oil passage L7. Further, in this configuration, several radiating fins 26, rising from the bottom wall 22 and extending in parallel to the weir 21, are provided substantially at equal intervals to perform heat dissipation through the drive unit casing.

The first discharge oil passages L11f, L11r, in the oil reservoir C2 for the generator G, have orifice openings 34f, 34r serving as inlets at the bottom wall 22 and the longitudinal wall 25, respectively. The bottom wall 22 and the longitudinal wall 25 are adjacent to the transverse wall 20 which is adjacent to the opening 32 of the feed oil passage L2. In the oil reservoir C2, the orifice openings 34f, 34r of the discharge oil passages L11f, L11r are provided on the same side as that of the opening 32 of the feed oil passage L2, and in association with oil cooling described later in detail, a guide wall 28 for the oil is provided to extend toward an opposite transverse wall 24 from the opening 32 in a manner to prevent generation of a short circuiting flow toward the orifice openings 34f, 34r of the discharge oil passages L11f, L11r from the opening 32 of the feed oil passage L2. Further, several radiating fins 27 rise from the bottom wall 22 and extend in parallel to the guide wall 28. The radiating fins 27 are provided substantially at equal intervals to perform heat dissipation through the drive unit casing.

Figure 5:
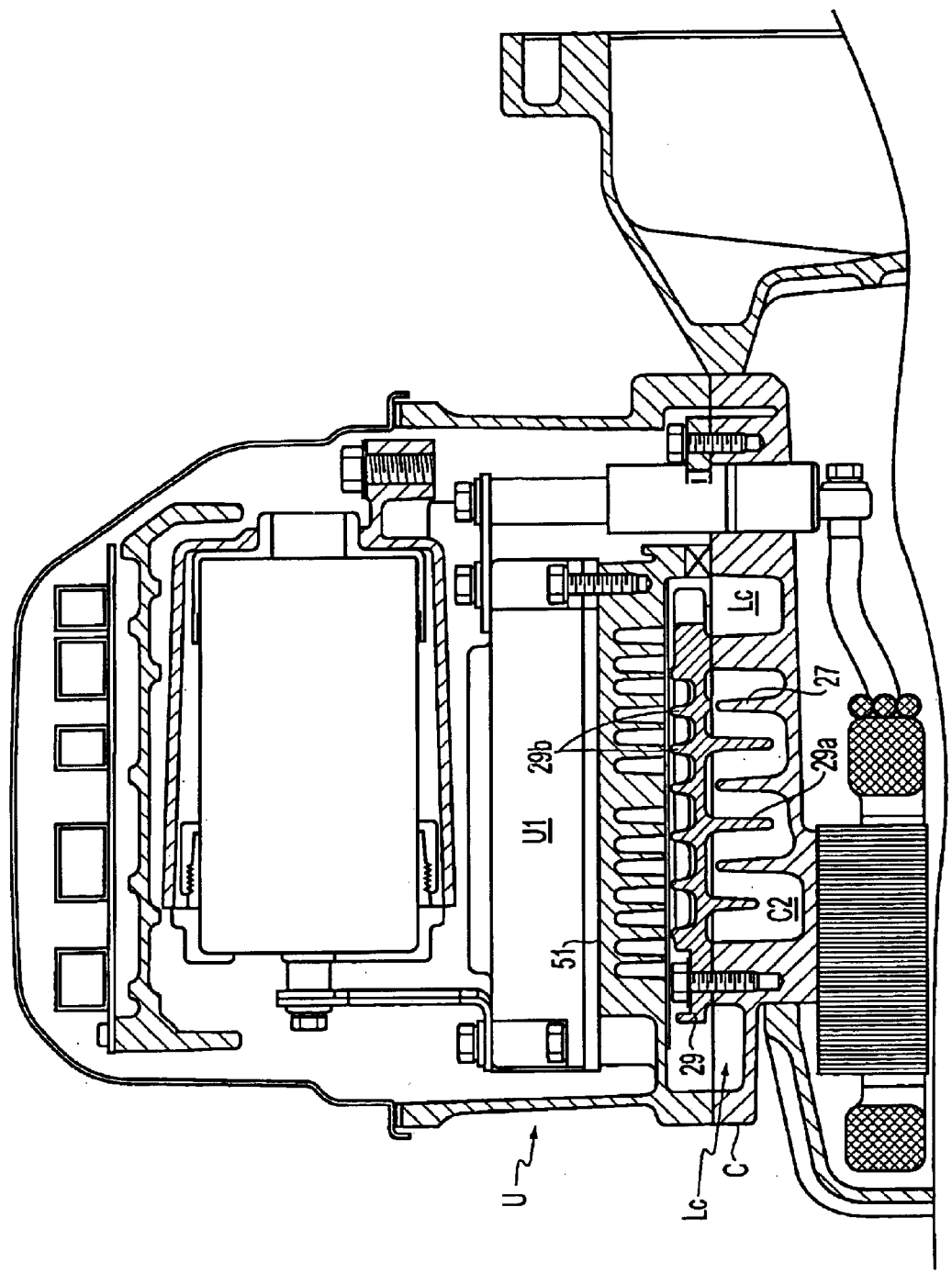
FIG. 5 is a partial, cross sectional view showing oil reservoirs and their related portions as viewed from a shaft-side direction of the hybrid drive apparatus according to the embodiment.
Figure 6:
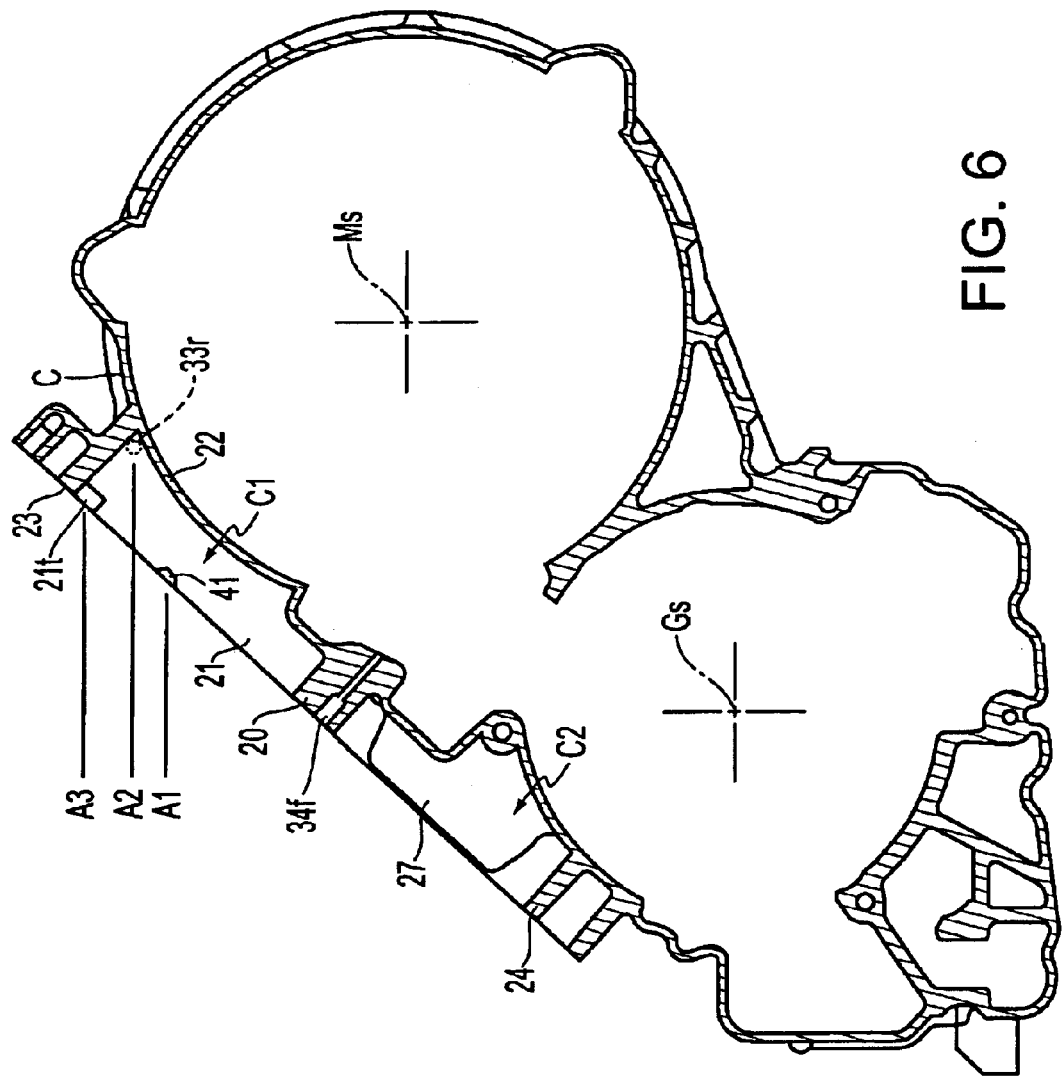
FIG. 6 is a cross sectional view taken along the line VI—VI in FIG. 4 and showing oil reservoirs and their related portions as viewed from a shaft-end direction of the hybrid drive apparatus according to the embodiment.

FIG. 5 is a cross sectional view showing a partial structure of the oil reservoirs C1, C2 and portions related thereto in an actual mounted position. FIG. 6 shows in a cross section (VI—VI cross section of FIG. 4) as viewed along a direction from a shaft end of the drive unit, the rotor shaft Ms of the motor and the rotor shaft Gs of the generator are at a different level. The outside diameters of the shafts are substantially the same while the oil reservoirs C1, C2 are arranged to circumscribe them with a view to compactness of the drive unit whereby the oil reservoir C1 for the motor is positioned, and inclined, in an upper area. And the oil reservoirs C1, C2 are formed outside an outer wall of the drive unit casing C and their opened surface sides are covered by a cover 29 (FIG. 5). With a positional relationship peculiar to such a configuration, an upper surface of the weir 21 abuts against the cover 29 and oil flow is not possible over the upper surface of the weir 21. Therefore, the weir 21 has a cut out in an uppermost position of the upper surface when mounted in the vehicle, that is, a position at level A3 (FIG. 6) to form an opening 21t. The opening 21t defines an overflow oil passage. Also, because the orifice 41 is, as a matter of course positioned at a level A1 that is lower than the overflow oil passage 21t, it is not opened in the middle of the longitudinal wall of the weir 21 but is provided by an opening formed by a notch on the upper surface of the weir 21. The notch has a smaller cut-out area than the opening 21t defining the overflow oil passage.

An opening formed in the longitudinal wall 25, where the orifice 33r of the first discharge oil passage is communicated to the oil reservoir C1, is positioned at an intermediate level A2 between the levels of openings 21t, 41 (FIG. 4). Also, an opening formed in the bottom wall 22, where orifice 33f of the first discharge oil passage (see FIG. 4) is communicated with the oil reservoir, is positioned at substantially the same level A2 as orifice 33r. On the basis of the positional relationship in the mounted position in the vehicle, when oil reaches the level A1 in the oil reservoir C1 for the motor, flow of the oil through the opening 41 is generated. When the oil then reaches the level A2, flow of the oil entering the openings of the both orifices 33r, 33f is also generated. Finally, when the oil reaches the level A3, flows of the oil through all the openings inclusive of the opening 21t are generated concurrently.

In this configuration, the drive unit arranges a control unit U, which includes an inverter for controlling the motor M and the generator G, integrally with the drive unit casing C, and because a power module U1, composed of a switching transistor and accompanying circuit elements, by which DC current of the unit U, in particular, of a battery power source is converted into AC current (three-phase AC current in the case where the electric motor is a three-phase AC current motor) due to the switching action, and a circuit board mounting thereon the transistor and circuit elements is large in calorific value, a flow passage Lc for a cooling medium for cooling the unit U is provided in contact with a heat sink 51 at a bottom of the power module U1. Because the flow passage Lc extends through a mount of the control unit U on the drive unit casing C, the oil reservoirs C1, C2 are arranged to interpose the cover or heat transfer wall 29, therebetween to contact with the flow passage Lc of a cooling medium, so that the oil in the oil reservoirs C1, C2 is cooled by heat dissipation to the cooling medium for cooling the power module U1.

In this manner, in order to ensure a large area of heat dissipation when the heat is dissipated to the cooling medium from the oil, several radiating fins 29a extending in parallel to the radiating fins 26, 27, and are positioned between the radiating fins 26, 27, are formed on a side of the cover or heat transfer wall 29, facing the oil reservoirs C1, C2. A multiplicity of radiating fins 29b also extending longitudinally in the same direction, are formed on a side facing, and extend into, the flow passage Lc of a cooling medium.

With the drive unit structured in the above manner, oil passing through the opening 41 of the weir 21 to be conducted, via the oil passage L7, to the oil passage L8 in the rotor shaft Ms enters into the in-rotor oil passages L9 from the oil passage L8 in the rotor shaft Ms to be discharged toward the coil Mc of a stator Mt from the diametrically extending oil hole due to centrifugal forces accompanying rotation of a rotor Mr, thus cooling the motor M in a state in which the oil reservoir C1 is low in oil level. Also, lubrication of the respective mechanisms is effected on the respective bearings by an oil discharged from the oil passage, which branches from the oil passage L7 to extend through the orifice 39, and the oil passage, which is opened to the diametrically extending oil holes and the shaft end. When an oil level in the oil reservoir C1 rises to a normal level, oil from the orifices 33f, 33r begins to drip and an oil discharged directly from the oil reservoir C1 is caused to blow against the stator core Mt and the stator coil Mc, thus performing lubrication of the respective mechanisms. Further, when an oil level in the oil reservoir C1 rises to go over the weir 21 (i.e., the oil level reaches opening 21t), flow through the opening 21t of the weir 21 adds to flow through the opening 41, so that an oil supply to the oil passage L8 in the rotor shaft Ms is increased. In this manner, oil once accumulated in the oil reservoir C1 passes through the oil passages L9 in the rotor Mr to thereby cool the rotor Mr. Further, the oil is discharged from both ends of the rotor Mr to be blown against the coil ends Mc at both ends of the rotor Mr and caused to drip from the orifices 33f, 33r, thus cooling the motor M.

The generator G is also cooled by oil. The oil enters into an in-rotor oil passage from the oil passage L5 in the rotor shaft Gs to be directed toward coil ends Gc of a stator Gt from the diametrically extending oil holes and is discharged due to centrifugal forces accompanying rotation of the rotor Gr. In this manner, the oil having passed through oil passages L10 in a rotor Gr to cool the rotor Gr and discharged from both ends of the rotor Gr is caused to blow against the coil ends Gc at both ends of the stator Gt, thereby cooling the generator. The oil discharged directly from the openings 34f, 34r of the oil reservoir C2 cools the generator. In this manner, the oil, having cooled the motor M and the generator G and been raised in temperature due to heat exchange, drips on the bottom of the drive unit casing C or flows down along the casing wall to be recovered into an oil sump in a lower area of the drive unit.

As described below in detail, with the drive unit, discharge of oil to the second discharge oil passage L7, from the second reservoir C1b, is restricted until oil supplied from the oil supply source, to be accumulated in the first reservoir C1a, reaches a level to pass through the opening 21t of the weir 21 in the oil reservoir C1, so that it is possible to rapidly accumulate an oil in the oil reservoir C1. Even in the case where oil flowability is bad, such as, at the time of a very low temperature, discharge of oil into the first discharge oil passages L6f, L6r is ensured. Accordingly, with such arrangement, the oil level in the oil reservoir C1 can be elevated to a level in a normal state even at the start in very low temperatures with the result that oil can be smoothly supplied to the first and second discharge oil passages L6f, L6r, L7.

Also, the first orifices 33f, 33r restrict discharge of oil from the first discharge oil passages L6f, L6r whereby it is possible to expedite the rise in the oil level in the first reservoir C1a even at the start in very low temperatures while ensuring the supply of oil to that side of the motor M, which requires a small amount of supply and is to be cooled, thereby enabling expediting lubrication of the respective mechanisms, which requires a large amount of the supply, and supply of oil to a side being cooled.

Also, even when an oil level in the oil reservoir C1 rises to place the oil reservoir C1 in a filled state, the second orifice 37 is used to increase discharge of an oil from the second discharge oil passage L7 in the same manner as at normal temperature, thereby suppressing a rise in pressure in the oil reservoir C1.

Also, because oil is discharged to the second discharge oil passage L7 through the opening 41 of the weir 21, in a state in which the oil level in the oil reservoir C1 is not over the weir 21, supply of oil to lubricating portions of the respective mechanisms and the side being cooled is ensured.

Further, even when the oil level in the oil reservoir C1 rises to place the oil reservoir C1 in a filled state, the second orifice 37 is used to ensure adequate discharge of oil from the second discharge oil passage L7 even at the time of bad flowability caused by very low temperature, so that it is possible to suppress a rise in pressure in the oil reservoir C1. Also, the restriction on flow with the weir 21 makes it possible to prevent an insufficiency in the discharge of oil to the first discharge oil passages L6f, L6r, which results from making the second orifice 37 large to take into account oil flowability at a time of very low temperature.

In addition, heat exchange with a cooling medium through the heat transfer wall 29 in the oil reservoir C1, in which oil circulating in the drive unit casing accumulates, enables preferentially cooling the oil whereby it is possible to efficiently cool the motor M and the respective mechanisms. At that time, because a rise in pressure in the oil reservoir C1 is suppressed, even at the time of very low temperature, seal leakage between the oil reservoir C1 and the cooling medium flow passage Lc, which contact with each other, is prevented whereby it is possible to prevent a cooling medium from being entrained into the oil.

While the invention has been described in detail on the basis of the embodiment, in which it is applied to a motor of a hybrid drive apparatus, the invention is not limited thereto but applicable to generators in the same manner, and further applicable to general electric drive units. Also, the first and second discharge passages are not limited to a coil of an electric motor and in-shaft oil passages but can be variously modified in structure within the scope described in the claims to be practicable.

What is claimed is:

1. An electric drive unit, comprising:
   a drive unit casing;
   an electric motor;
   a feed oil passage, which supplies a working oil for cooling and lubrication to respective mechanisms of the drive unit including the electric motor, the electric motor and the feed oil passage both provided in the drive unit casing; and
   an oil reservoir, which is provided in an upper area of the drive unit casing, the oil reservoir comprising:
      a first reservoir in communication with a first discharge oil passage as well as a supply source of the working oil;
      a second reservoir in communication with a second discharge oil passage; and
      a weir between the first reservoir and the second reservoir.

2. The electric drive unit according to claim 1, wherein the first discharge oil passage is opened above a coil of the electric motor through a first orifice, and the second discharge oil passage is communicated to an in-shaft oil passage of the electric motor leading to the respective mechanisms.

3. The electric drive unit according to claim 2, wherein the second discharge oil passage comprises a second orifice having a larger opening area than that of the first orifice.

4. The electric drive unit according to claim 3, wherein the weir comprises an opening providing communication between the first reservoir and the second reservoir to guarantee supply of the working oil to the in-shaft oil passage of the electric motor.

5. The electric drive unit according to claim 4, wherein the opening is composed of a first opening having a larger opening area than that of the first orifice and a second opening having a larger opening area than that of the first opening, the second opening being arranged above the first opening when mounted on a vehicle.

6. The electric drive unit according to claim 5, wherein an opening of the first discharge oil passage in the first reservoir is arranged below a second opening of the weir when mounted on a vehicle.

7. The electric drive unit according to claim 6, wherein the opening of the first discharge oil passage in the first reservoir is arranged above the first opening of the weir.

8. The electric drive unit according to claim 3, wherein the opening area of the second orifice is set on the basis of viscosity of the working oil in a cold state and pressure resistance of the oil reservoir.

9. The electric drive unit according to claim 4, wherein the opening area of the second orifice is set on the basis of viscosity of the working oil in a cold state and pressure resistance of the oil reservoir.

10. The electric drive unit according to claim 2, wherein the weir comprises an opening providing communication between the first reservoir and the second reservoir to guarantee supply of the working oil to the in-shaft oil passage of the electric motor.

11. The electric drive unit according to claim 10, wherein the opening is composed of a first opening having a larger opening area than that of the first orifice and a second opening having a larger opening area than that of the first opening, the second opening being arranged above the first opening when mounted on a vehicle.

12. The electric drive unit according to claim 11, wherein an opening of the first discharge oil passage in the first reservoir is arranged below a second opening of the weir when mounted on a vehicle.

13. The electric drive unit according to claim 12, wherein the opening of the first discharge oil passage in the first reservoir is arranged above the first opening of the weir.

14. The electric drive unit according to claim 10, wherein the opening area of the second orifice is set on the basis of viscosity of the working oil in a cold state and pressure resistance of the oil reservoir.

15. The electric drive unit according to claim 1, wherein the oil reservoir contacts with a cooling medium flow passage with a heat transfer wall therebetween.

* * * * *